United States Patent
Inoue et al.

(10) Patent No.: US 10,256,505 B2
(45) Date of Patent: Apr. 9, 2019

(54) POSITIVE ELECTRODE ACTIVE MATERIAL FOR NONAQUEOUS ELECTROLYTE SECONDARY BATTERIES, PRODUCTION METHOD THEREOF, AND NONAQUEOUS ELECTROLYTE SECONDARY BATTERY INCLUDING SAID MATERIAL

(71) Applicant: SUMITOMO METAL MINING CO., LTD., Tokyo (JP)

(72) Inventors: Katsuya Inoue, Niihama (JP); Tetsufumi Komukai, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 152 days.

(21) Appl. No.: 15/313,194

(22) PCT Filed: May 26, 2015

(86) PCT No.: PCT/JP2015/065066
§ 371 (c)(1),
(2) Date: Mar. 13, 2017

(87) PCT Pub. No.: WO2015/182595
PCT Pub. Date: Dec. 3, 2015

(65) Prior Publication Data
US 2017/0187065 A1 Jun. 29, 2017

(30) Foreign Application Priority Data
May 27, 2014 (JP) .................................. 2014-108759

(51) Int. Cl.
*H01M 10/0562* (2010.01)
*H01M 10/056* (2010.01)
(Continued)

(52) U.S. Cl.
CPC ...... *H01M 10/0562* (2013.01); *C01G 53/006* (2013.01); *C01G 53/50* (2013.01);
(Continued)

(58) Field of Classification Search
CPC ...... H01M 4/362; H01M 4/364; H01M 4/505; H01M 4/525
See application file for complete search history.

(56) References Cited

U.S. PATENT DOCUMENTS

| 2003/0129495 A1 | 7/2003 | Yamato et al. | |
|---|---|---|---|
| 2006/0204849 A1* | 9/2006 | Saito | H01M 4/131 429/231.1 |

(Continued)

FOREIGN PATENT DOCUMENTS

| JP | 2000-113884 A | 4/2000 |
|---|---|---|
| JP | 2002-175801 A | 6/2002 |

(Continued)

OTHER PUBLICATIONS

International Search Report dated Sep. 1, 2015, issued in counterpart International Application No. PCT/JP2015/065066 (2 pages).
(Continued)

*Primary Examiner* — Ula C Ruddock
*Assistant Examiner* — Matthew W Van Oudenaren
(74) *Attorney, Agent, or Firm* — Westerman, Hattori, Daniels & Adrian, LLP

(57) ABSTRACT

Provided is a positive electrode active material that can be used to fabricate a nonaqueous electrolyte secondary battery having excellent output characteristics not only in an environment at normal temperature but also in all temperature environments from extremely low to high temperatures.
A positive electrode active material for nonaqueous electrolyte secondary batteries, the positive electrode active material includes a boron compound and lithium-nickel-cobalt-
(Continued)

manganese composite oxide of general formula (1) having a layered hexagonal crystal structure. The lithium-nickel-cobalt-manganese composite oxide includes secondary particles composed of agglomerated primary particles. The boron compound is present on at least part of the surface of the primary particles, and contains lithium.

$$Li_{1+s}Ni_xCo_yMn_zMo_tM_wO_2 \quad (1)$$

10 Claims, 3 Drawing Sheets

(51) Int. Cl.
*H01M 4/505* (2010.01)
*H01M 4/525* (2010.01)
*C01G 53/00* (2006.01)
*H01M 4/131* (2010.01)
*H01M 4/1391* (2010.01)
*H01M 4/36* (2006.01)
*H01M 4/485* (2010.01)
*H01M 4/62* (2006.01)

(52) U.S. Cl.
CPC ......... *H01M 4/131* (2013.01); *H01M 4/1391* (2013.01); *H01M 4/366* (2013.01); *H01M 4/485* (2013.01); *H01M 4/505* (2013.01); *H01M 4/525* (2013.01); *H01M 4/62* (2013.01); *H01M 10/056* (2013.01); *C01P 2004/03* (2013.01); *C01P 2004/34* (2013.01); *C01P 2004/45* (2013.01); *C01P 2004/51* (2013.01); *C01P 2004/61* (2013.01); *C01P 2004/84* (2013.01)

(56) References Cited

U.S. PATENT DOCUMENTS

| | | | |
|---|---|---|---|
| 2007/0099087 A1* | 5/2007 | Mihara | C01B 25/45 429/231.95 |
| 2009/0220859 A1 | 9/2009 | Yoon et al. | |
| 2011/0200880 A1* | 8/2011 | Yu | H01M 4/505 429/223 |
| 2013/0277604 A1 | 10/2013 | Shimokita et al. | |
| 2014/0011090 A1* | 1/2014 | Toya | H01M 4/505 429/223 |
| 2015/0079471 A1 | 3/2015 | Fang et al. | |

FOREIGN PATENT DOCUMENTS

| | | |
|---|---|---|
| JP | 2004-335278 A | 11/2004 |
| JP | 2005-251716 A | 9/2005 |
| JP | 2007-63033 A | 3/2007 |
| JP | 2007-299668 A | 11/2007 |
| JP | 2009-206100 A | 9/2009 |
| JP | 2011-108554 A | 6/2011 |
| JP | 2013-239434 A | 11/2013 |
| WO | 02/41419 A1 | 5/2002 |
| WO | 2012/131881 A1 | 10/2012 |
| WO | WO2012131881 * | 10/2012 |

OTHER PUBLICATIONS

International Preliminary Report on Patentability (Form PCT/IB/373) issued in counterpart International Application No. PCT/JP2015/065066 dated Nov. 29, 2016, with Written Opinion (Form PCT/ISA/237) dated Sep. 1, 2015 (5 pages).
Extended European Search Report dated Nov. 30, 2017 issued in counterpart application No. 15800554.6 (9 pages).

* cited by examiner

POSITIVE ELECTRODE ACTIVE MATERIAL FOR NONAQUEOUS ELECTROLYTE SECONDARY BATTERIES, PRODUCTION METHOD THEREOF, AND NONAQUEOUS ELECTROLYTE SECONDARY BATTERY INCLUDING SAID MATERIAL

TECHNICAL FIELD

The present invention relates to a positive electrode active material for nonaqueous electrolyte secondary batteries, a production method thereof, and a nonaqueous electrolyte secondary battery including the positive electrode active material.

BACKGROUND ART

Along with recent widespread use of portable electronic devices such as mobile phones and laptop personal computers, there has been a strong demand for development of small, lightweight nonaqueous electrolyte secondary batteries having high energy density. There also has been a strong demand for development of high-output secondary batteries for use in electric vehicles including hybrid vehicles. Batteries in electric vehicles, in particular, are used in a wide temperature range from high temperatures to extremely low temperatures and therefore are required to be high output in this wide temperature range.

Such high-output secondary batteries include nonaqueous electrolyte secondary batteries such as lithium-ion secondary batteries. A lithium-ion secondary battery is essentially constituted of a negative electrode, a positive electrode, and an electrolyte solution. Active materials used in the negative electrode and in the positive electrode are each a material capable of deintercalating and intercalating lithium ions.

Such nonaqueous electrolyte secondary batteries are being actively researched and developed. Among these, ones including a layered or spinel lithium-metal composite oxide as the positive electrode material have high voltage, as high as 4 V, and are therefore increasingly used in practical settings where high-energy-density batteries are required.

As a positive electrode material, there have been proposed lithium-metal composite oxides, such as lithium-cobalt composite oxide ($LiCoO_2$), which is relatively easily synthesized, lithium-nickel composite oxide ($LiNiO_2$) containing nickel that is less expensive than cobalt, lithium-nickel-cobalt-manganese composite oxide ($LiNi_{1/3}Co_{1/3}Mn_{1/3}O_2$), lithium-manganese composite oxide ($LiMn_2O_4$) containing manganese, and lithium-nickel-manganese composite oxide ($LiNi_{0.5}Mn_{0.5}O_2$).

Among these positive electrode materials, lithium-nickel-cobalt-manganese composite oxide that has excellent thermal stability and high capacity has been receiving attention in recent years. The lithium-nickel-cobalt-manganese composite oxide is a layered compound, just like lithium-cobalt composite oxide and lithium-nickel composite oxide are, and contains nickel, cobalt, and manganese substantially at a ratio of 1:1:1 at its transition metal sites.

Because of its low cobalt ratio compared to that of lithium-cobalt composite oxide ($LiCoO_2$), however, the lithium-nickel-cobalt-manganese composite oxide ($LiNi_{1/3}Co_{1/3}Mn_{1/3}O_2$) when used as a positive electrode material tends to result in poor output characteristics, high resistance, and a reduced likelihood of achieving a high-output outcome.

In the circumstances, a positive electrode material that achieves excellent battery performance (excellent cycle characteristics, high capacity, and high output) is sought after, and a technique is proposed that includes addition of tungsten or another metal to a lithium-metal composite oxide.

Patent Literature 1 proposes lithium cobalt oxide or lithium nickel oxide to which at least one element selected from B, Bi, Mo, P, Cr, V, and W is added. According to the inventors, the presence of the added element allows active movement of substances in the liquid phase, facilitates particle growth, facilitates formation of particles that have a smooth and even surface, reduces the specific surface area of LiCoO or the like to be synthesized, allows efficient action of the conductive aid acetylene black that is added to the positive electrode active material during battery fabrication, enhances electronic conductivity of the positive electrode material, and significantly lowers the internal resistance of the resulting battery.

Patent Literature 2 proposes a positive electrode active material for nonaqueous electrolyte secondary batteries, the positive electrode active material including at least a composite oxide that is composed of lithium and transition metal and has a layered structure, the composite oxide of lithium and transition metal being in a form of particles consisting of either primary particles or agglomerated primary particles, namely, secondary particles, or both of these particles, the aspect ratio of the primary particles being from 1 to 1.8. At least on the surface of the particles of the composite oxide of lithium and transition metal, a compound is present that contains at least one kind selected from the group consisting of molybdenum, vanadium, tungsten, boron, and fluorine. According to the inventors, the presence of the compound containing at least one kind selected from molybdenum, vanadium, tungsten, boron, and fluorine on the particle surfaces enhances conductivity.

Patent Literature 3 proposes powders of a compound of lithium and transition metal, for use as a positive electrode material for lithium secondary batteries. The powders are mainly composed of a compound of lithium and transition metal, the compound having a function to intercalate and deintercalate lithium ions. The powders are formed by adding, to this main component, a single kind of compound containing at least one element selected from B and Bi and a single kind of compound containing at least one element selected from Mo, W, Kb, Ta, and Re, followed by firing. According to the inventors, the firing process after addition of the added compounds causes formation of fine powders of the compound of lithium and transition metal while suppressing particle growth and sintering and can therefore cause formation of powders of a lithium-containing transition metal compound that are improved in the rate, improved in the output characteristics, easy to handle, and easy to be prepared into an electrode.

Patent Literature 4 proposes a positive electrode composition for nonaqueous electrolyte solution secondary batteries, the positive electrode composition including a composite oxide of lithium and transition metal of the general formula $Li_aNi_{1-x-y}Co_xM^1_yW_zM^2_wO_2$ (where $1.0 \le a \le 1.5$, $0 \le x \le 0.5$, $0 \le y \le 0.5$, $0.002 \le z \le 0.03$, $0 \le w \le 0.02$, $0 \le x+y \le 0.7$, $M^1$ is at least one kind selected from the group consisting of Mn and Al, and $M^2$ is at least one kind selected from the group consisting of Zr, Ti, Mg, Ta, Nb, and Mo) as well as a boron compound that contains at least the element boron and the element oxygen. The inventors claim as follows: because the positive electrode composition includes not only the composite oxide of lithium and transition metal essentially containing nickel and tungsten but also a particular boron compound, the output characteristics and the cycle characteristics are enhanced compared to the case where the positive electrode composition solely includes the composite oxide of lithium and transition metal.

Another technique is proposed that uses a positive electrode including particles having a uniform and appropriate size and a hollow structure and therefore achieves excellent battery performance (excellent cycle characteristics, low resistance, and high output).

Patent Literature 5 proposes a positive electrode active material for nonaqueous electrolyte secondary batteries including lithium-nickel-manganese composite oxide, the lithium-nickel-manganese composite oxide being composed of lithium-containing composite oxide that has a layered hexagonal crystal structure and being represented by the general formula $Li_{1+u}Ni_xMn_yCo_zM_tO_2$ (where $-0.05 \leq u \leq 0.50$, $x+y+z+t=1$, $0.3 \leq x \leq 0.7$, $0.1 \leq y \leq 0.55$, $0 \leq z \leq 0.4$, $0 \leq t \leq 0.1$, and M is one or more added elements that are selected from among Mg, Ca, Al, Ti, V, Cr, Zr, Nb, Mo, and W), the positive electrode active material having an average particle size of 2 μm to 8 μm, having a value [(d90-d10)/average particle size], which is an index of the extent of particle size distribution, of 0.60 or lower, and having a hollow structure that has an outer shell section composed of agglomerated sintered primary particles and a hollow section present inside the outer shell section. According to the inventors, the use of this positive electrode active material can achieve high capacity, excellent cycle characteristics, and high output in the resulting nonaqueous secondary battery.

CITATION LIST

Patent Literature

[Patent Literature 1] Japanese Unexamined Patent Application Publication No. 2000-113884
[Patent Literature 2] Japanese Unexamined Patent Application Publication No. 2005-251716
[Patent Literature 3] Japanese Unexamined Patent Application Publication No. 2011-108554
[Patent Literature 4] Japanese Unexamined Patent Application Publication No. 2013-239434
[Patent Literature 5] International Publication No. WO2012/131881

SUMMARY OF INVENTION

Technical Problem

The discussions in patent Literatures 1 to 5 are directed to enhancing output characteristics, but none of these conducted studies on output characteristics at extremely low temperatures or at nigh temperatures. Therefore, there is a demand for development of a positive electrode active material that achieves better output characteristics in a wide temperature range.

The present invention has been devised based on the above circumstances, and an object of the present invention is to provide a positive electrode active material that can be used to fabricate a nonaqueous electrolyte secondary battery having excellent output characteristics not only in an environment at normal temperature but also in an environment in a wide temperature range from extremely low temperatures to high temperatures.

Another object of the present invention is to provide a method by which the positive electrode active material can be easily produced on an industrial scale.

Solution to Problem

The inventors of the present, invention have conducted intensive research to achieve these objects and, as a result, have found that the presence of a boron compound on the surface of molybdenum-containing lithium-nickel-cobalt-manganese composite oxide can enhance output, characteristics in an environment in a wide temperature range. Thus, the present invention has now been completed.

Namely, a positive electrode active material for nonaqueous electrolyte secondary batteries according to an embodiment of the present invention is a positive electrode active material for nonaqueous electrolyte secondary batteries including a boron compound and lithium-nickel-cobalt-manganese composite oxide of general formula (1) having a layered hexagonal crystal structure, the lithium-nickel-cobalt-manganese composite oxide including secondary particles, the secondary particles being composed of agglomerated primary particles, the boron compound being present on at least part of the surface of the primary particles, the boron compound containing lithium:

$$Li_{1+s}Ni_xCo_yMn_zMo_tM_wO_2 \qquad (1)$$

(where $-0.05 \leq s \leq 0.20$, $x+y+z+t+w=1$, $0.1 \leq x \leq 0.7$, $0.1 \leq y \leq 0.5$, $0.1 \leq z \leq 0.5$, $0.0003 \leq t \leq 0.05$, $0 \leq w \leq 0.05$, and M is one or more elements selected from Ca, Mg, Al, Ti, V, Cr, Zr, Nb, Hf, and Ta).

The lithium-nickel-cobalt-manganese composite oxide preferably has a ratio (B/Me) of the number of boron (B) atoms in the positive electrode active material to the total number of atoms of nickel, cobalt, manganese, and M (Me) from 0.001 to 0.05.

The secondary particles preferably have an average particle size from 3 μm to 20 μm.

The primary particles preferably have an average particle size from 0.2 μm to 0.5 μm.

The secondary particles preferably have an index [(d90-d10)/average particle size] of extent of particle size distribution of 0.60 or lower.

The secondary particles further preferably have a hollow structure in which an individual particle has a hollow section within the particle.

A method of producing a positive electrode active material for nonaqueous electrolyte secondary batteries according to an embodiment of the present invention includes a crystallization step of obtaining particles of nickel-cobalt-manganese composite hydroxide of the general formula $Ni_xCo_yMn_zMo_tM_w(OH)_{2+\alpha}$ (where $x+y+z+t+w=1$, $0.1 \leq x \leq 0.7$, $0.1 \leq y \leq 0.5$, $0.1 \leq z \leq 0.5$, $0.0003 \leq t \leq 0.05$, $0 \leq w \leq 0.05$, $0 \leq \alpha \leq 0.5$, and M is one or more elements selected from Ca, Mg, Al, Ti, V, Cr, Zr, Nb, Hf, and Ta), a lithium-mixing step of mixing the nickel-cobalt-manganese composite hydroxide particles with a lithium compound so that the ratio of the number of lithium atoms to the total number of atoms of metallic elements except for lithium is from 0.95 to 1.20, to obtain a lithium mixture, a firing step of firing the resulting lithium mixture by retaining the resulting lithium mixture in an oxidizing atmosphere at a firing temperature from 800° C. to 1000° C. for 5 to 20 hours to obtain lithium-nickel-cobalt-manganese composite oxide particles, a boron-mixing step of mixing the lithium-nickel-cobalt-manganese composite oxide particles with a boron material to obtain a boron mixture, and a heat-treatment step of subjecting the boron mixture to heat treatment in an oxidizing atmosphere at a temperature from 300° C. to 580° C.

In this method, the boron material is preferably boron oxide and/or boron oxoacid. The boron material is preferably o-boric acid.

Preferably, this method further includes a pulverization step of pulverizing the lithium-nickel-cobalt-manganese composite oxide particles obtained in the firing step.

A nonaqueous electrolyte secondary battery according to an embodiment of the present invention includes a positive electrode, a negative electrode, a separator, and a nonaqueous electrolyte, the positive electrode including, as its positive electrode material, the positive electrode active material for nonaqueous electrolyte secondary batteries described above.

Effects of the Invention

The positive electrode active material for nonaqueous electrolyte secondary batteries of the present invention has very low resistance in an environment in a wide temperature range from extremely low temperatures to high temperatures and when used in the positive electrode of a battery, achieves excellent output characteristics. Having such excellent electrical properties, namely, high output in an environment in a wide temperature range as well as high capacity, the nonaqueous secondary battery of the present invention can be suitably used as a compact secondary battery for use in today's portable electronics, such as mobile phones and laptop personal computers, and in power tools. In particular, having such excellent output characteristics in a wide temperature range, the nonaqueous secondary battery of the present invention is very useful as a secondary battery for a power supply device installed in, among others, hybrid vehicles or electric vehicles.

The method of the present invention is easily applied to industrial scale production and is therefore industrially very useful.

DESCRIPTION OF EMBODIMENTS

Figure 1:
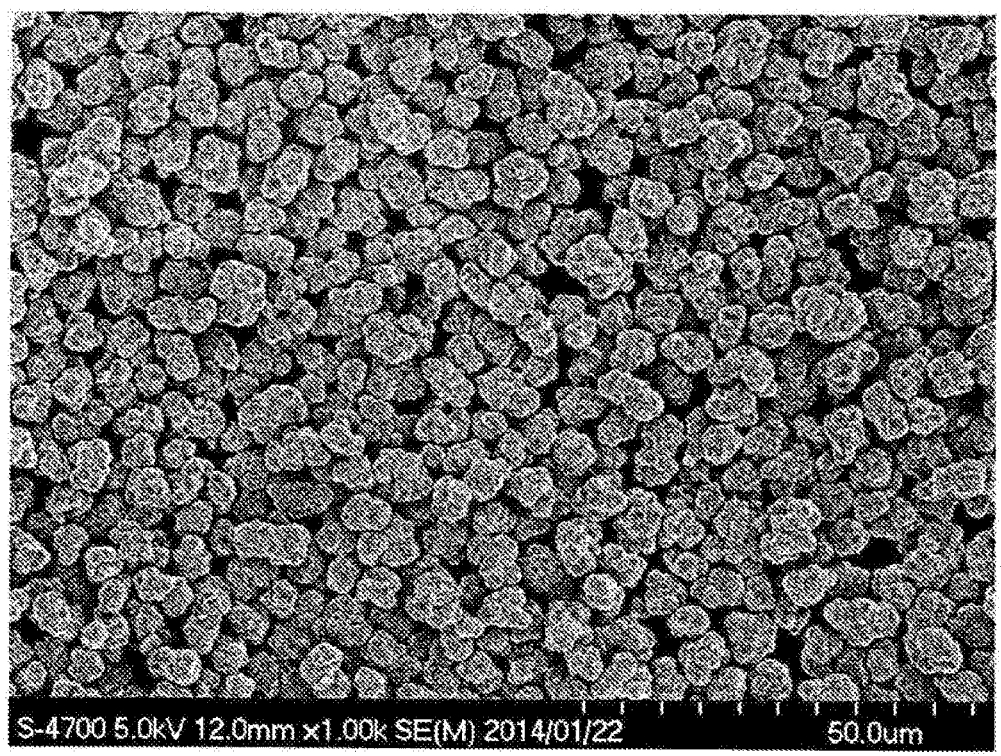
FIG. 1 is an FE-SEM photograph (1,000-time magnification) of a positive electrode active material.

In the following, embodiments of the present invention will be described.
(1) Positive Electrode Active Material for Nonaqueous Electrolyte Secondary Batteries A positive electrode active material for nonaqueous electrolyte secondary batteries (hereinafter, sometimes simply called "positive electrode active material") according to an embodiment of the present invention includes a boron compound and lithium-nickel-cobalt-manganese composite oxide of general formula (1) having a layered hexagonal crystal structure. The lithium-nickel-cobalt-manganese composite oxide (hereinafter, also called "lithium composite oxide") includes secondary particles that are composed of agglomerated primary particles. The boron compound is present on at least part of the surface of the primary particles.

$$Li_{1+s}Ni_xCo_yMn_zMo_tM_wO_2 \quad (1)$$

(where $-0.05 \leq s \leq 0.20$, $x+y+z+t+w=1$, $0.1 \leq x \leq 0.7$, $0.1 \leq y \leq 0.5$, $0.1 \leq z \leq 0.5$, $0.0003 \leq t \leq 0.05$, $0 \leq w \leq 0.05$, and M is one or more elements selected from Ca, Mg, Al, Ti, V, Cr, Zr, Mb, Hf, and Ta)

Because Mo is thus added and the boron compound is thus present on the surface of the lithium composite oxide primary particles, the resistance of the positive electrode active material according to an embodiment of the present invention can be lowered in a wide temperature range from low temperatures to high temperatures (for example, from $-30°$ C. to $50°$ C.). When this positive electrode active material is used as the positive electrode material of a secondary battery, the output characteristics of the battery can be remarkably enhanced in an environment in a wide temperature range from low temperatures to high temperatures.

In the following, the positive electrode active material according to an embodiment of the present invention is described in detail.
(1-a) Molybdenum (Mo)

Addition of molybdenum (Mo) to the lithium composite oxide lowers the resistance of the positive electrode active material according to an embodiment of the present invention in a wide temperature range from low temperatures to high temperatures and, in particular, remarkably lowers the resistance in a temperature range from normal temperature to high temperatures, compared to the case in which no molybdenum (Mo) is added, with the detailed mechanism of this phenomenon unspecified. When addition of Mo is accompanied by the presence of the boron compound, the resistance of the positive electrode active material can be further lowered.

The Mo content, denoted as t in general formula (1), ranges as follows: $0.0003 \leq t \leq 0.05$. Within this range, the lithium composite oxide achieves a sufficient effect of lowering resistance and when used in the positive electrode of a battery, can achieve high capacity. When t is smaller than 0.0003, the effect of lowering resistance in the temperature range described above is not obtained, and when t is greater than 0.05, capacity decreases.

From the viewpoint of obtaining a greater effect of lowering resistance and obtaining higher capacity, t preferably satisfies $0.0005 \leq t \leq 0.02$ and more preferably satisfies $0.001 \leq t \leq 0.01$.
(1-b) Boron (B)

The positive electrode active material according to an embodiment of the present invention has a configuration where boron (B) forms a lithium-containing boron compound and the boron compound is present on at least part of the surface of the lithium composite oxide primary particles. Because of this configuration, the resistance in a temperature range from low temperatures to normal temperature is lowered.

An increase in the resistance at low temperatures is suppressed to some extent by addition of Mo to the lithium composite oxide, and can be further suppressed by the presence of the boron compound, resulting in a positive electrode active material having very low resistance at low temperatures.

For the effect of lowering resistance to be obtained, it is necessary that boron is present on part of the surface of the primary particles. When boron is completely dissolved in the lithium composite oxide, a sufficient effect of lowering resistance cannot be obtained, resulting in a great decrease in capacity. The boron compound is not required to be covering the entire surface of the lithium composite oxide primary particles. Instead, the boron compound is simply required to be present on at least, part of the surface of the primary particles so as to achieve the effect of lowering resistance. The boron compound on the surface of the lithium composite oxide primary particles preferably adheres to the surface. This adhesion can enhance the conductivity of both the boron compound and the lithium composite oxide, achieving the effect of lowering resistance.

Although it is difficult to observe the state of boron thus present, it is conjectured that the element with which boron forms the boron compound together is excess lithium on the surface of the primary particles and therefore the boron compound contains lithium-boron composite oxide. It is presumed that the lithium-boron composite oxide facilitates the movement of lithium (Li) ions between the lithium composite oxide and the electrolyte and because this lithium-boron composite oxide is present on at least part of the surface of the primary particles, the effect of lowering resistance is obtained.

The ratio (B/Me) of the number of boron (B) atoms in the positive electrode active material to the total number of atoms of nickel, cobalt, manganese, molybdenum, and M (Me) in the lithium composite oxide is preferably from 0.001 to 0.05 and more preferably from 0.002 to 0.01. Although some boron dissolves in the lithium composite oxide during a heat-treatment step, which is to be described below as a step of subjecting a boron mixture to heat treatment, a sufficient amount of boron compound is still formed on the surface of the primary particles when the ratio B/Me is within the range described above, achieving the effect of lowering resistance and in the case where the lithium composite oxide is used in the positive electrode of a battery, successfully suppressing a decrease in capacity.

The lithium composite oxide includes secondary particles that are composed of agglomerated primary particles. Between the agglomerated primary particles, gaps and grain boundaries are present that the electrolyte can enter. Through these gaps and grain boundaries, the electrolyte solution penetrates into the secondary particles and, as a result, intercalation and deintercalation of Li is facilitated. This phenomenon is favorable to output characteristics and capacity. Because the positive electrode active material according to an embodiment of the present invention thus includes the boron compound not only on the surface of the lithium composite oxide primary particles, namely, on the surface of the secondary particles, but also in the gaps and the grain boundaries, movement, of Li is facilitated and the effect of lowering resistance is obtained.

(1-c) Nickel (Ni), Cobalt (Co), and Manganese (Mn)

The Ni content, denoted as x in general formula (1), ranges as follows: $0.1 \leq x \leq 0.7$, preferably $0.3 \leq x \leq 0.6$, and more preferably $0.3 \leq x \leq 0.5$. The Co content denoted as y ranges as follows: $0.1 \leq y \leq 0.5$ and preferably $0.2 \leq y \leq 0.4$. The Mn content denoted as z ranges as follows: $0.1 \leq z \leq 0.5$ and preferably $0.2 \leq z \leq 0.4$.

When x, y, or z is within the range described above, properties such as initial discharge capacity, cycle characteristics, and thermal stability are excellent.

The lithium composite oxide can contain one or more elements (M) selected from Ca, Mg, Al, Ti, V, Cr, Zr, Kb, Hf, and Ta, as needed. The M content, denoted as w in general formula (1), ranges as follows: $0 \leq w \leq 0.05$ and preferably $0 \leq w \leq 0.03$.

(1-d) Shape of Lithium Composite Oxide Constituting Positive Electrode Active Material Primary Particles The average particle size of the lithium composite oxide primary particles is preferably from 0.2 μm to 0.5 μm. When the lithium composite oxide primary particles having an average particle size within this range are used in the positive electrode of a battery, the output characteristics, the capacity, and the cycle characteristics can be enhanced. When the average particle size of the primary particles is smaller than 0.2 μm, excellent cycle characteristics may not be obtained, and when the average particle size is greater than 0.5 μm, excellent output characteristics or high capacity may not be obtained.

Secondary Particles

The average particle size of the lithium composite oxide secondary particles is preferably from 3 μm to 20 μm and more preferably from 4 μm to 15 μm. When the lithium composite oxide secondary particles having an average particle size within this range are used in the positive electrode of a battery, not only the excellent output characteristics and the high capacity but also excellent packaging inside the positive electrode can be obtained. When the average particle size of the secondary particles is smaller than 3 μm, excellent packaging inside the positive electrode may not be obtained, and when the average particle size is greater than 20 μm, excellent output characteristics or high capacity may not be obtained.

The value [(d90-d20)/average particle size], which is an index of the extent of particle size distribution of the secondary particles, is preferably 0.60 or lower, more preferably 0.55 or lower, and further preferably 0.50 or lower. Within this range where contamination of fine particles and oversized particles is suppressed, the particle size of the secondary particles is uniform and therefore excellent cycle characteristics are obtained. As the value [(d90-d10)/average particle size] decreases, the particle size of the secondary particles becomes more uniform but also tends to vary depending on production conditions. Therefore, the lower limit to the value [(d90-d10)/average particle size] is about 0.25.

The structure of the positive electrode active material according to an embodiment of the present invention is not particularly limited, and can be a solid and filled structure, for example. When the secondary particles have a hollow structure in which an individual particle has a hollow section within the particle, penetration of the electrolyte into the secondary particles is further facilitated and therefore excellent output characteristics are even more likely to be obtained. The hollow structure may have a plurality of hollow sections therein. Alternatively, the structure of the positive electrode active material according to an embodiment of the present invention may be a porous structure in which the secondary particles have many gaps between them.

(1-e) Battery Properties

When the positive electrode active material according to an embodiment of the present invention is used in the positive electrode of a #2042 coin-type nonaqueous electrolyte secondary battery, for example, the resistance of the positive electrode in an environment at an extremely low temperature of −30° C. is preferably 7 $\Omega/cm^2$ or lower, more preferably 6.5 $\Omega/cm^2$ or lower, and further preferably 6.0 $\Omega/cm^2$ or lower, and the resistance of the positive electrode in an environment at a high temperature of 50° C. is preferably 0.4 $\Omega/cm^2$ or lower, more preferably 0.35 $\Omega/cm^2$ or lower, and further preferably 0.3 $\Omega/cm^2$ or lower. Thus, compared to a conventional positive electrode active material, the positive electrode active material according to an embodiment of the present invention when used as a positive electrode active material of a battery achieves excellent output characteristics in an environment in a wide temperature range, from an environment at extremely low temperatures to an environment at high temperatures. Particularly because of the excellent output characteristics in an environment at extremely low temperatures, the positive electrode active material according to an embodiment of the present invention is an excellent positive electrode active material for nonaqueous electrolyte secondary batteries for use in electric vehicles.

The initial discharge capacity of the positive electrode active material according to an embodiment of the present invention when used in the positive electrode of a #2042 coin-type nonaqueous electrolyte secondary battery, for example, is preferably 160 mAh/g or higher and more preferably 165 mAh/g or higher.

(2) Method of Producing Positive Electrode Active Material for Nonaqueous Electrolyte Secondary Batteries The method of producing the positive electrode active material for nonaqueous electrolyte secondary batteries according to an embodiment of the present invention is not particularly limited and can be a conventionally known method. Particularly preferably, the method includes the following steps (a) to (e) (hereinafter, the method is sometimes simply called "the method according to an embodiment, of the present invention").

(a) A crystallization step of obtaining particles of nickel-cobalt-manganese composite hydroxide of the general formula $Ni_xCo_yMn_zMo_tM_w$ $(OH)_{2+\alpha}$ (where $x+y+z+t=1$, $0.1 \leq x \leq 0.7$, $0.1 \leq y \leq 0.5$, $0.1 \leq z \leq 0.5$, $0.0003 \leq t \leq 0.05$, $0 \leq w \leq 0.05$, $0 \leq \alpha \leq 0.5$, and M is one or more elements selected from Ca, Mg, Al, Ti, V, Cr, Zr, Mb, Hf, and Ta)

(b) A lithium-mixing step of mixing the nickel-cobalt-manganese composite hydroxide particles with a lithium compound so that the ratio of the number of lithium atoms to the total number of atoms of metallic elements except for lithium is from 0.95 to 1.20, to obtain a lithium mixture (c) A step of firing the resulting lithium mixture by retaining the resulting lithium mixture in an oxidizing atmosphere at a firing temperature from 800° C. to 1000° C. for 5 to 20 hours to obtain lithium-nickel-cobalt-manganese composite oxide particles (d) A boron-mixing step of mixing the lithium-nickel-cobalt-manganese composite oxide particles with a boron material to obtain a boron mixture (e) A heat-treatment step of subjecting the boron mixture to heat treatment in an oxidizing atmosphere at a temperature from 450° C. to 550° C.

In the following, an embodiment of the method of producing the positive electrode active material according to an embodiment of the present invention is described in detail in terms of the respective steps.

(2-a) Crystallization Step

Typically and often, industrial production of nickel-cobalt-manganese composite hydroxide particles (hereinafter, sometimes simply called "composite hydroxide particles") by crystallization adopts the continuous crystallization technique. By this technique, a composite hydroxide having a uniform composition can be formed easily and in large quantity. In typical crystallization, the resulting composite hydroxide particles consist of secondary particles that are composed of agglomerated primary particles and, as a result, the positive electrode active material produced by using such composite hydroxide particles also consist of secondary particles that are composed of agglomerated primary particles. In the continuous crystallization technique, on the other hand, the particle size of the resulting particles tends to distribute in a relatively wide normal distribution and cannot be always uniform. When such composite hydroxide particles having a relatively wide particle size distribution are used as a raw material of a positive electrode active material for a lithium-ion secondary battery, a fine powder smaller than 3 μm may be contained in the resulting, assembled lithium-ion secondary battery and in that case, the cycle characteristics tend to be impaired. In addition, when the particle size is not uniform, the reaction resistance can be high, adversely affecting the output obtained from the battery.

Therefore, it is preferable that the crystallization step, in which typical continuous crystallization can be adopted for obtaining nickel-cobalt-manganese composite hydroxide particles, is distinctly divided into a nuclei formation stage and a particle growth stage as disclosed, for example, in International Publication No. WO2012/131881 so as to make the particle size more uniform and to make the particle size distribution of the composite hydroxide narrower.

In the following, the crystallization technique divided into the nuclei formation stage and the particle growth stage is described.

Nuclei Formation Step

First, a nickel salt, a cobalt salt, a manganese salt, and a salt of the added element M, all of which are readily soluble in water, are dissolved in water in a predetermined proportion, and a mixed aqueous solution containing nickel, cobalt, manganese, and the added element M is prepared. The nickel salt, the cobalt, salt, and the manganese salt are each preferably a sulfate. The mixed aqueous solution is fed into a crystallization reaction tank together with an aqueous solution containing an ammonium ion source, such as an aqueous ammonia solution, with stirring to prepare a reaction solution in the reaction tank. To the reaction tank, an aqueous alkali solution such as an aqueous sodium hydroxide solution is simultaneously fed so as to control the pH of the reaction solution at a constant level. When precipitation occurs upon addition of the aqueous solution of the salt of the added element M to the mixed aqueous solution, the aqueous solution of the salt of the added element M is fed simultaneously with but separately from the mixed aqueous solution. By thus controlling the amount of the aqueous alkali solution to feed and therefore making the pH constant, very small nuclei of metal hydroxide can be selectively formed in the reaction tank.

The pH of the reaction solution is controlled at 12.0 or higher and preferably from 12.0 to 14.0 at a reference temperature of 25° C. Within this range, very small nuclei of metal hydroxide can be selectively formed in the reaction solution. When the pH is lower than 12.0, nuclei growth simultaneously occurs, the particle size distribution tends to become wide, the total number of nuclei tends to decrease, and the particles tend to become oversized. The total number of nuclei can be controlled by adjusting the pH, the ammonia concentration, and the amount of the mixed aqueous solution fed during the nuclei formation step.

The ammonia concentration in the reaction solution is preferably maintained at a certain level within a range from 3 g/L to 15 g/L. When the ammonia concentration is lower than a certain level, the solubility of the metal ions cannot be maintained at a certain level, the resulting hydroxide particles do not become uniform, gel-like nuclei tend to form, and, as a result, the particle size distribution tends to become wide. An ammonia concentration of 15 g/L or higher is unpreferable because the resulting hydroxide becomes dense, the final product positive electrode active material for nonaqueous electrolyte secondary batteries also becomes dense in its structure, and, as a result, the specific surface area may become small.

The temperature of the reaction solution is preferably set from 35° C. to 60° C. At a temperature lower than 35° C., solubility of the metal ions being fed is insufficient due to the low temperature and therefore nuclei formation is facilitated, making it difficult to control nuclei formation. At a temperature higher than 60° C., ammonia volatilization is facilitated and therefore the amount of ammonia to be used for complexation becomes insufficient, resulting in a tendency toward decreasing solubility of the metal ions as in the case described above. The pH and the crystallization time in the nuclei formation step can be optionally set depending on the target average particle size of the composite hydroxide particles.

Particle Growth Step

In the particle growth step, the pH of the reaction solution is controlled to be from 10.5 to 12.0 at a reference temperature of 25° C. and also to be lower than the pH in the nuclei formation step. With the pH controlled within this range after nuclei formation, growth of nuclei formed in the nuclei formation step proceeds preferentially while formation of new nuclei is being suppressed and, as a result, the uniformity of the particle size of the composite hydroxide particles can be significantly enhanced. When the pH is higher than 12.0, not only particle growth but also nuclei formation occurs, making it difficult to significantly enhance the uniformity of the particle size. When the pH is lower than 10.5, the amount of metal ions remaining in the reaction solution increases and therefore the production efficiency decreases. When a sulfate is used as a raw material, a pH level lower than 10.5 is unpreferable because the content of sulfur (S) remaining in the composite hydroxide particles increases. The ammonia concentration in the reaction solution and the temperature of the reaction solution may be set at the same ranges as these in the nuclei formation step.

Alternatively, the liquid component of the reaction solution can be partially discharged from the reaction tank after nuclei formation or during the particle growth stage so as to increase the concentration of the composite hydroxide particles in the reaction solution in subsequent particle growth. In this way, the particle size distribution of the particles can be narrowed and the denseness of the particles can be increased.

By controlling the atmosphere inside the reaction tank in the nuclei formation step and the particle growth step, the particle structure of the positive electrode active material produced by using the composite hydroxide particles can be controlled. In other words, by controlling the oxygen concentration in the atmosphere, the size of the composite hydroxide primary particles can be controlled and the denseness of the composite hydroxide particles can also be controlled. By lowering the oxygen concentration inside the reaction tank and creating a non-oxidizing atmosphere, the denseness of the composite hydroxide particles is increased and the denseness of the resulting positive electrode active material is also increased, creating a solid and filled structure. On the other hand, by raising the oxygen concentration inside the reaction tank, the denseness of the composite hydroxide particles is decreased and the resulting positive electrode active material tends to have a hollow structure or a porous structure. Particularly by creating an oxidizing atmosphere inside the reaction tank in early phases of the nuclei formation step and of the particle growth step and then controlling the atmosphere to shift to a non-oxidizing atmosphere, the denseness in the central part of the composite hydroxide particles can be increased and the denseness in the peripheral part of the composite hydroxide particles can be decreased. A positive electrode active material produced by using such composite hydroxide particles has a hollow structure that has a hollow section of a sufficient size. The presence or absence of the hollow section and the size of the hollow section can be controlled by adjusting the time period for an oxidizing atmosphere and the period for a non-oxidizing atmosphere. Increasing the size of the central part with low denseness can increase the size of the hollow section.

(2-b) Lithium-Mixing Step

The lithium-mixing step is a step of mixing the composite hydroxide particles obtained in the crystallization step with a lithium compound so that the ratio (Li/Me) of the number of lithium (Li) atoms to the total number of atoms of metallic elements (Me) except for lithium is from 0.95 to 1.20, to obtain a lithium mixture. When the ratio Li/Me is lower than 0.95, the reaction resistance of the positive electrode of a nonaqueous electrolyte secondary battery that is produced by using the resulting positive electrode active material is high, and therefore the output obtained from the battery is low. When the ratio Li/Me is higher than 1.20, the initial discharge capacity of the resulting positive electrode active material decreases and the reaction resistance of the positive electrode increases.

A lithium compound that can be used is not particularly limited, and lithium hydroxide, lithium carbonate, or a mixture of these can be suitably used, for example. From the viewpoints of ease of handling and consistent quality, lithium carbonate is preferably used.

It is preferable that the composite hydroxide particles and the lithium compound are thoroughly mixed together. Mixing can be conducted with a typical mixer, such as a shaker mixer, a Lödige Mixer, a Julia Mixer, or a V-type Blender. Thorough mixing with the lithium compound is simply required to be conducted to an extent that the shape of the composite hydroxide particles is not impaired.

(2-c) Firing Step

The firing step is a step of firing the resulting lithium mixture by retaining the resulting lithium mixture in an oxidizing atmosphere at a firing temperature from 800° C. to 1000° C. for 5 to 20 hours to obtain lithium-nickel-cobalt-manganese composite oxide particles.

When the firing temperature is lower than 800° C., the reaction between the composite hydroxide particles and the lithium compound does not proceed sufficiently and therefore lithium does not sufficiently disperse in the composite hydroxide particles, causing excess lithium and unreached nickel-cobalt-manganese composite oxide to remain or the crystal structure to fail to form sufficiently, resulting in poor output characteristics or low capacity. When the firing temperature is higher than 1000° C., intense sintering occurs among the lithium composite oxide particles to induce abnormal particle growth to form oversized particles, resulting in poor output characteristics and low capacity.

The time period during which the firing temperature is maintained is 5 to 20 hours and preferably 5 to 10 hours. When the time period is shorter than 5 hours, formation of the lithium-nickel-cobalt-manganese composite oxide does not proceed sufficiently. When the time period is longer than 20 hours, intense sintering occurs among the lithium-nickelcobalt-manganese composite oxide particles to induce abnormal particle growth, resulting in formation of oversized particles.

The atmosphere during firing is an oxidizing atmosphere and is preferably an atmosphere with an oxygen concentration of 18% by volume to 100% by volume. In other words, firing is preferably conducted in a stream of air or oxygen. In consideration of cost, firing is particularly preferably conducted in an air stream. When the oxygen concentration is lower than 18% by volume, oxidation does not proceed sufficiently and therefore the resulting lithium-nickel-cobalt-manganese composite oxide may have insufficient crystallinity.

The furnace for use in firing is not particularly limited and is simply required to be capable of heating in a stream of air or oxygen. An electric furnace that generates no gas is preferable. A batch furnace or a continuous furnace is used.

Under these firing conditions, both of intense sintering among the resulting lithium composite oxide particles and abnormal particle growth are suppressed but slight sintering sometimes occurs. When slight sintering occurs, a pulverization step of pulverizing the resulting lithium-metal composite oxide particles can be further conducted. Pulverization may be conducted by a typical method and is simply required to be conducted to an extent that the lithium composite oxide secondary particles are not destroyed.

(2-d) Boron-Mixing Step

The boron-mixing step is a step of mixing the lithium composite oxide particles obtained in the firing step with the boron material to obtain a boron mixture.

Boron contained in the boron material mixed with the lithium composite oxide particles remains substantially unchanged in amount after the subsequent heat treatment step. Accordingly, the boron content of the boron material to be used in mixing is simply required to be appropriate to the content of the positive electrode active material and, therefore, the ratio (B/Me) of the number of boron (B) atoms to the total number of atoms of nickel, cobalt, manganese, molybdenum, and M (Me) in the lithium composite oxide is preferably from 0.001 to 0.05 and more preferably from 0.002 to 0.01. When the ratio B/Me is within this range, the ratio B/Me in the positive electrode active material can also fall within this range, resulting in further enhancement of output characteristics in an environment at low temperatures.

The boron material used in the method according to an embodiment of the present invention is not particularly limited, and is preferably boron oxide, boron oxoacid, or a mixture thereof and more preferably o-boric acid. From the viewpoints of ease of handling and consistent quality, the boron material is more preferably o-boric acid.

For uniform boron distribution among the lithium composite oxide particles, it is preferable that the lithium composite oxide particles and the boron material are thoroughly mixed together before firing. Mixing can be conducted with a typical mixer, such as a shaker mixer, a Lödige Mixer, a Julia Mixer, or a V-type Blender. Thorough mixing with the boron material is simply required to be conducted to an extent that the shape of the lithium composite oxide particles is not impaired.

(2-e) Heat-Treatment Step

The heat-treatment step is a step of subjecting the boron mixture to heat treatment in an oxidizing atmosphere at a temperature from 300° C. to 580° C., preferably at a temperature higher than 450° C. and not higher than 580° C., and more preferably at a temperature from 460° C. to 575° C.

When heated to or above 300° C., the boron material starts to react with the lithium composite oxide, particularly with lithium in the lithium composite oxide. As a result, the boron compound is formed on at least part of the surface of the lithium composite oxide primary particles. Then, during heat treatment conducted within the temperature range described above, formation of the boron compound proceeds sufficiently and the resulting boron compound disperses on the interface between the boron compound and the lithium composite oxide primary particles for adhesion When the temperature during the heat treatment is lower than 300° C., the reaction between the boron material and the lithium composite oxide does not proceed sufficiently, causing unreacted boron material to remain or the structure of the boron compound to fail to form sufficiently, resulting in failed attainment of the sufficient effect of lowering resistance described above. When the temperature during the heat treatment is higher than 580° C., boron dissolves in the crystal structure of the lithium composite oxide and therefore no boron compound is obtained, resulting in failed attainment of the sufficient effect of lowering resistance. In addition, interaction of the boron compound with Mo can increase initial discharge capacity. Particularly by conducting the heat treatment within the preferable temperature range described above, both resistance and initial discharge capacity can be further improved.

The time period of the heat treatment is preferably 5 to 20 hours and more preferably 5 to 10 hours. Within this range, formation of the boron compound can proceed sufficiently and output characteristics can be further enhanced. When the time period of firing is shorter than 5 hours, formation of the boron compound sometimes does not proceed sufficiently, and when the time period of firing is longer than 20 hours, too much boron sometimes dissolves in the crystal structure of the lithium composite oxide.

The atmosphere during the heat treatment is simply required to be an oxidizing atmosphere and is preferably an atmosphere with an oxygen concentration of 18% by volume to 100% by volume. In other words, the heat treatment is preferably conducted in a stream of air or oxygen. In consideration of cost, the heat treatment is particularly preferably conducted in an air stream. Although the heat treatment in an oxidizing atmosphere causes formation of the boron compound, formation of the boron compound sometimes does not proceed sufficiently when the oxygen concentration is lower than 18% by volume. The furnace for use in the heat treatment can be the same furnace as that used in the firing step.

(3) Nonaqueous Electrolyte Secondary Battery

The nonaqueous electrolyte secondary battery according to an embodiment of the present invention is essentially constituted of a positive electrode, a negative electrode, and a nonaqueous electrolyte solution, in other words, it has the same components as those of a typical nonaqueous electrolyte secondary battery. Embodiments described below are merely illustrative, and the nonaqueous electrolyte secondary battery according to an embodiment of the present invention can be implemented in the embodiments described in the present specification to which various modifications and improvements are added on the basis of the knowledge of those skilled in the art. Applications of the nonaqueous electrolyte secondary battery according to an embodiment of the present invention are not particularly limited.

(3-a) Positive Electrode

The positive electrode active material for nonaqueous electrolyte secondary batteries obtained as described above is used to fabricate the positive electrode of a nonaqueous electrolyte secondary battery, for example, in the following way.

First, the positive electrode active material in a powder form, a conductive material, and a binding agent are mixed together. Thereto, activated carbon and a solvent for viscosity adjustment or for other purposes are added, as needed. The resulting mixture is kneaded and thus a positive electrode mixture material paste is prepared. In this procedure, the mixing ratio of the respective ingredients of the positive electrode mixture material paste is an important factor that determines the performance of the resulting nonaqueous electrolyte secondary battery. It is desirable that as in the case of the positive electrode of a typical nonaqueous electrolyte secondary battery, the content of the positive electrode active material is 60 parts by mass to 95 parts by mass, the content of the conductive material is 1 part by mass to 20 parts by mass, and the content of the binding agent is 1 part, by mass to 20 parts by mass with the solid content of the positive electrode mixture material except for the solvent being assumed to be 100 parts by mass.

The resulting positive electrode mixture material paste is applied onto the surface of a collector made of foil of aluminum or the like and then dried for solvent volatilization. When it is necessary to enhance the electrode density, pressure may be applied thereto with, for example, a roll press. In this way, a positive electrode sheet can be prepared. For use in fabrication of the battery, the resulting positive electrode sheet can be, for example, cut into a size appropriate to the intended battery. The method of producing the positive electrode is not limited to this method and may be another method.

The conductive material that can be used in producing the positive electrode is, for example, graphite (natural graphite, artificial graphite, or expanded graphite, for example) or a carbon-black-based material such as acetylene black or Ketjenblack.

The binding agent binds the active material particles together and can be, for example, polyvinylidene fluoride (PVDF), polytetrafluoroethylene (PTFE), fluorine rubber, ethylene-propylene-diene rubber, styrene butadiene, a cellulose-based resin, or polyacrvlic acid.

Alternatively, when needed, the positive electrode active material, the conductive material, and activated carbon are dispersed to prepare a positive electrode mixture material and to which, a solvent containing the binding agent dissolved therein is added. The specific solvent that can be used is an organic solvent such as N-methyl-2-pyrrolidone. For increasing electric double layer capacity, activated carbon can be added to the positive electrode mixture material.

(3-b) Negative Electrode

The negative electrode is produced by mixing the metal lithium or lithium alloy, for example, or alternatively a negative electrode active material capable of occluding and deintercalating lithium ions, together with a binding agent; adding an appropriate solvent thereto to obtain a negative electrode mixture material paste; applying the resulting paste onto the surface of a collector made of a metal foil such as copper foil; drying the resultant; and when it is necessary to enhance electrode density, compressing the resultant.

The negative electrode active material that can be used is, for example, a fired organic compound such as fired natural graphite, fired artificial graphite, or a fired phenolic resin, or a carbonaceous substance powder such as coke powder. The binding agent for use in the negative electrode can be a fluorine-containing resin such as PVDF, as in the case of the positive electrode. The solvent that can be used for dispersing the active material and the binding agent is an organic solvent such as N-methyl-2-pyrrolidone.

(3-c) Separator

Between the positive electrode and the negative electrode, a separator is interposed. The separator separates the positive electrode from the negative electrode and holds the electrolyte. The separator that can be used is a thin film made of polyethylene, polypropylene, or the like and having many micropores.

(3-d) Nonaqueous Electrolyte Solution

The nonaqueous electrolyte solution is an organic solvent containing a lithium salt as a supporting electrolyte dissolved therein.

The organic solvent that can be used is, for example, one kind selected from cyclic carbonates such as ethylene carbonate, propylene carbonate, butylene carbonate, and trifluoropropylene carbonate, acyclic carbonates such as diethyl carbonate, dimethyl carbonate, ethyl methyl carbonate, and dipropyl carbonate, ether compounds such as tetrahydrofuran, 2-methyltetrahydrofuran, and dimethoxyethane, sulfur compounds such as ethyl methyl sulfone and butanesultone, and phosphorus compounds such as triethyl phosphate and trioctyl phosphate, alone or as a mixture of two or more of these.

The supporting electrolyte that can be used is, for example, $LiPF_6$, $LiBF_4$, $LiClO_4$, $LiAsF_6$, $LiN(CF_3SO_2)_2$, or a composite salt of these.

The nonaqueous electrolyte solution may further contain a radical scavenger, a surfactant, and a flame retardant, for example.

(3-e) Shape and Configuration of Battery

The shape of the nonaqueous electrolyte secondary battery according to an embodiment of the present invention including the positive electrode, the negative electrode, the separator, and the nonaqueous electrolyte solution thus described can be various shapes, such as a cylinder and a laminate.

Regardless of the shape, the nonaqueous electrolyte secondary battery is fabricated by stacking the positive electrode and the negative electrode with the separator interposed between them to form an electrode body; impregnating the resulting electrode body in the nonaqueous electrolyte solution; connecting a positive electrode collector to a positive electrode terminal exposed to the outside and also a negative electrode collector to a negative electrode terminal exposed to the outside, with a collector lead or the like; and hermetically enclosing these parts into a battery casing.

(3-f) Properties

According to an embodiment of the present invention, the positive electrode active material for nonaqueous electrolyte secondary batteries having high capacity and excellent output characteristics can be obtained by an industrially applicable method. The resulting nonaqueous electrolyte secondary battery is suitable as a power supply for use in compact and portable electronics that are required to exhibit high capacity at all time (laptop personal computers and mobile phone units, for example).

Compared to a conventional battery including a lithium-cobalt-oxide-based or lithium-nickel-oxide-based positive electrode active material, the nonaqueous electrolyte secondary battery according to an embodiment of the present invention has excellent thermal stability, excellent safety, high capacity, and excellent output characteristics. With these properties, the nonaqueous electrolyte secondary battery according to an embodiment of the present invention can be made smaller and can be enhanced in its output and therefore is suitable as a power supply for use in electric vehicles, which have limited space for its power supply.

The present invention can be implemented as a power supply for use in electric vehicles, which operate solely on electrical energy, and it can also be implemented as a power supply for use in what are called hybrid electric vehicles, which operate on a combination of electrical energy and a combustion engine such as a gasoline engine and a diesel engine.

EXAMPLES

The present invention will be described further in detail by examples and comparative examples according to embodiments of the present invention. The scope of the present invention, however, is not limited to these examples.

Analysis and evaluation of metals contained in the positive electrode active materials in the examples and the comparative examples are conducted by the following methods.

Figure 2:
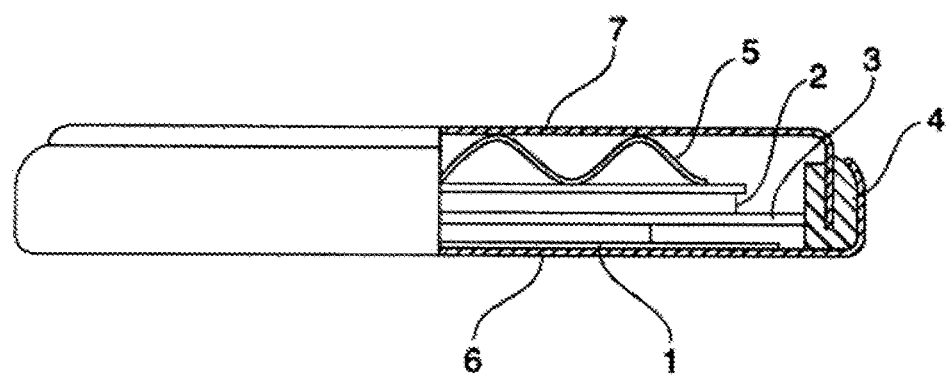
FIG. 2 is a schematic view of a battery fox evaluation used in examples.
Figure 3:
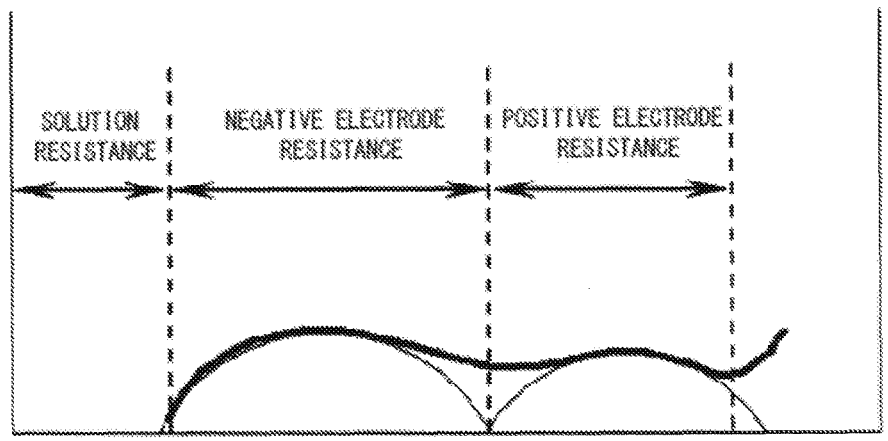
FIG. 3 is a Nyquist plot for impedance evaluation.
Figure 4:
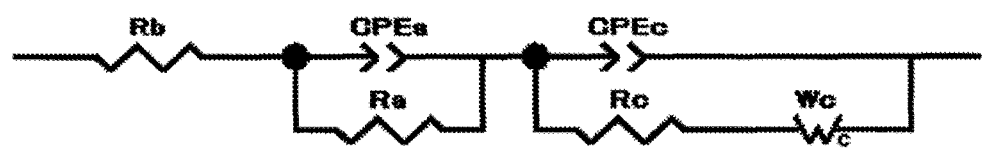
FIG. 4 is an equivalent circuit used in an example of impedance evaluation and in analysis.

1. Methods of Analysis and Evaluation (1) Composition analysis: Measurement was conducted by ICP optical emission spectroscopy.
(2) Average particle size and [(d90-d10)/average particle size]:
Measurement was conducted on a laser diffraction/scattering particle size distribution analyzer (Microtrac HRA manufactured by Nikkiso Co., Ltd.).
(3) Initial Discharge Capacity:
Initial discharge capacity was measured as follows: a coin cell shown in FIG. 2 was fabricated and left to itself for about 24 hours; after the open circuit voltage (OCV) became constant, the coin cell was charged to a cut-off voltage of 4.3 V at a density of current flowing toward the positive electrode of 0.1 mA/cm$^2$; after left for 1 hour, the coin cell was discharged to a cut-off voltage of 3.0 V; and the level of capacity at this time was defined as the initial discharge capacity. The discharge capacity was measured with a multichannel voltage/current generator (R6741A manufactured by Advantest Corporation).
(4) Reaction Resistance:
The reaction resistance was measured by the AC impedance method after charging the coin cell at a charging electric potential of 4.1 V while the temperature of the coin cell was being controlled at the measurement temperature. Measurement was conducted by using a frequency response analyzer (1400A model manufactured by Solartron) and a potentiostat/galvanostat (1470E model manufactured by Solartron), creating a Nyquist plot shown in FIG. 3, and calculating the fitting with the use of an equivalent circuit (FIG. 4) to determine the positive electrode resistance (reaction resistance).

Example 1

Crystallization Step

A reaction tank (60 L) was charged half full with water. The temperature inside the reaction tank was set at 40° C. in an air atmosphere with stirring. Thereto, a proper amount of a 25%-by-mass aqueous sodium hydroxide solution and a proper amount of a 25%-by-mass aqueous ammonia solution were added, followed by adjusting the pH of the liquid inside the reaction tank to be 12.8 at a reference temperature of 25° C. as well as the ammonia concentration in the liquid to be 10 g/L. Thereto, a mixed aqueous solution of 2.0 mol/L nickel sulfate, 2.0 mol/L cobalt sulfate, and 2.0 mol/L manganese sulfate (the molar ratio of metallic elements was Ni:Co:Mn=38:32:30) was added at a rate of 130 ml/minute, and simultaneously an aqueous sodium molybdate solution was added thereto with the flow rate being controlled to achieve a molar ratio of metallic elements of Ni:Co:Mn:Mo=38:32:30:0.3. Thus, a react ion aqueous solution was obtained. Simultaneously with this procedure, a 25%-by-mass aqueous ammonia solution and a 25%-by-mass aqueous sodium hydroxide solution were also added thereto at a constant rate with the pH maintained at 12.8 (pH for nuclei formation) and under these conditions, crystallization was allowed to proceed for 2 minutes and 30 seconds. Subsequently, addition of the 25%-by-mass aqueous sodium hydroxide solution was halted temporarily while nitrogen gas was being distributed so as to lower the oxygen concentration inside the reaction tank to 2% by volume or lower until the pH reached 11.6 (pH for nuclei growth) at a reference temperature of 25° C. After the pH reached 11.6, addition of the 25%-by-mass aqueous sodium hydroxide solution was resumed. With the pH being maintained at 11.6, crystallization was allowed to proceed for another 4 hours for completion. After the completion of crystallization, the resulting product was rinsed with water, filtrated, and dried. Thus, nickel-cobalt-manganese composite hydroxide particles of $Mi_{0.38}Co_{0.32}Mn_{0.30}Mo_{0.003}(OH)_{2+\alpha}$ ($0\leq\alpha\leq0.5$) were obtained. Due to the short duration of crystallization in an air atmosphere, the resulting composite hydroxide particles had a solid and filled structure.

Lithium-Mixing Step and Firing Step

The resulting composite hydroxide particles were thoroughly mixed with lithium carbonate that had been weighed to satisfy Li/Me=1.07, with the use of a shaker-mixer device (TURBULA Type T2C manufactured by Willy A. Bachofen (WAB)), and thus a lithium mixture was obtained. The resulting lithium mixture was fired by retaining it in an air stream (oxygen, 21% by volume) at 900° C. for 10 hours, followed by pulverization. Thus, lithium-nickel-cobalt-manganese composite oxide particles were obtained.

Boron-Mixing Step and Heat-Treatment Step

The resulting lithium composite oxide particles were thoroughly mixed with o-boric acid that had been weighed to satisfy B/Me=0.005, with the use of a shaker mixer device (TURBULA Type T2C manufactured by Willy A. Bachofen (WAB)), and thus a boron mixture was obtained. The resulting boron mixture was retained in an air stream (oxygen, 21% by volume) at 500° C. for 10 hours for heat treatment, and a positive electrode active material was obtained.

Table 1 shows the composition of the resulting positive electrode active material as well as the average particle size and the value [(d90-d10)/average particle size] of the secondary particles. FIG. 1 shows the result of observation of the positive electrode active material with a scanning electron microscope (SEM, JSM-6360LA manufactured by JEOL Ltd.). According to SEM observation of the cross section of the positive electrode active material particles, the average particle size of the primary particles was 0.3 μm. According to analysis of the surface of the resulting positive electrode active material by X-ray photoelectron spectroscopy (XPS, VersaProbe II manufactured by ULVAC-PHI, Inc.), a wave attributed to chemical combination between boron and lithium was observed on the boron peak. Analysis by X-ray diffraction (XRD, X'Pert PRO manufactured by PANalytical) showed an increase in the lattice constant of the lithium-nickel-cobalt-manganese composite oxide, indicating that some of the boron compound thus formed dispersed on the surface of the lithium-nickel-cobalt-manganese composite oxide particles and a lithium-containing boron compound adhered to the surface.

Battery Fabrication

The resulting positive electrode active material in an amount of 52.5 mg, 15 mg of acetylene black, and 7.5 mg of a polytetrafluoroethylene resin (PTFE) were mixed together, and the resulting mixture was pressed with a pressure of 100 MPa into a shape having a diameter of 11 mm and a thickness of 100 μm. Thus, a positive electrode (an electrode for evaluation) (1) shown in FIG. 2 was obtained. The resulting positive electrode (1) was dried at 120° C. in a vacuum dryer for 12 hours. Then, the resulting positive electrode (1) was used to fabricate a #2032 coin cell in a glove box that had an Ar atmosphere and a dew point controlled at −80° C. As a negative electrode (2), a piece of lithium (Li) metal having a diameter of 17 mm and a thickness of 1 mm was used. As an electrolyte solution, a mixed liquid of equal amounts of ethylene carbonate (EC) and diethyl carbonate (DEC) containing 1 M $LiClO_4$ as a supporting electrolyte (manufactured by Tomiyama Pure Chemical Industries, Ltd.) was used. As a separator (3), a polyethylene porous film having a thickness of 25 Jim was used. The coin ceil had a gasket (4) and a wave washer (5) and was assembled with the use of a positive electrode case (6) and a negative electrode case (7). Table 2 shows the measurement of the positive electrode resistance of the resulting positive electrode active material at the measurement temperatures.

Example 2

A positive electrode active material was obtained and evaluated in the same manner as in Example 1 except that composite hydroxide particles were formed with addition of an amount of an aqueous sodium molybdate solution that satisfied a molar ratio of metallic elements of Ni:Co:Mn:Mo=38:32:30:0.5. The results of evaluation are shown in Table 1 and Table 2.

Example 3

A positive electrode active material was obtained and evaluated in the same manner as in Example 1 except that o-boric acid in an amount satisfying B/Me=0.003 was mixed with the lithium composite oxide particles and the temperature during heat treatment was set at 400° C. The results of evaluation are shown in Table 1 and Table 2. According to analysis of the resulting positive electrode active material by XPS (VersaProbe II manufactured by ULVAC-PHI, Inc.), a wave attributed to chemical combination between boron and lithium was observed to a very slight extent on the boron peak. This observation indicates the presence of a lithium-containing boron compound on at least part of the surface of the primary particles. Analysis by XRD (X'Pert PRO manufactured by PANalytical) did not show an increase in the lattice constant of the lithium-nickel-cobalt-manganese composite oxide, indicating that the boron compound was not dispersed on the surface of the lithium-nickel-cobalt-manganese composite oxide particles.

Example 4

A positive electrode active material was obtained and evaluated in the same manner as in Example 1 except that o-boric acid in an amount satisfying B/Me=0.003 was mixed with the lithium composite oxide particles. The results of evaluation are shown in Table 1 and Table 2.

Comparative Example 1

A positive electrode active material was obtained and evaluated in the same manner as in Example 1 except that nickel-cobalt-manganese composite hydroxide particles of $Ni_{0.38}Co_{0.32}Mn_{0.30}(OH)_{2+\alpha}$ ($0 \leq \alpha \leq 0.5$) obtained without addition of an aqueous sodium molybdate solution were used and that, the lithium composite oxide particles before mixed with o-boric acid were used as the positive electrode active material. The results of evaluation are shown in Table 1 and Table 2.

Comparative Example 2

A positive electrode active material was obtained and evaluated in the same manner as in Example 1 except that the lithium composite oxide particles before mixed with o-boric acid were used as the positive electrode active material. The results of evaluation are shown in Table 1 and Table 2.

Comparative Example 3

A positive electrode active material was obtained and evaluated in the same manner as in Example 1 except that nickel-cobalt-manganese composite hydroxide particles of $Ni_{0.38}Co_{0.32}Mn_{0.30}(OH)_{2+\alpha}$ ($0 \leq \alpha \leq 0.5$) obtained without addition of an aqueous sodium molybdate solution were used. The results of evaluation are shown in Table 1 and Table 2.

Comparative Example 4

A positive electrode active material was obtained and evaluated in the same manner as in Example 1 except that o-boric: acid in an amount that satisfied B/Me=0.003 was mixed with the lithium composite oxide particles and that the temperature during heat treatment was set at 600° C. The results of evaluation are shown in Table 1 and Table 2. Analysis of the resulting positive electrode active material by XPS (VersaProbe II manufactured by ULVAC-PHI, Inc.) did not show a boron peak, probably indicating that the boron compound was not present on the surface of the primary particles but instead it was dissolved in the lithium-nickel-cobalt-manganese composite oxide.

TABLE 1

| | Composition | Mo content (atom %) *1 | B/Me | Heat treatment temp. (° C.) | Av. particle size (μm) | (d90-d10)/ Av. particle size |
|---|---|---|---|---|---|---|
| Ex. 1 | $Li_{1.07}Ni_{0.38}Co_{0.32}Mn_{0.30}Mo_{0.003}O_2$ | 0.3 | 0.005 | 500 | 5.9 | 0.44 |
| Ex. 2 | $Li_{1.07}Ni_{0.38}Co_{0.32}Mn_{0.30}Mo_{0.005}O_2$ | 0.5 | 0.005 | 500 | 5.7 | 0.45 |
| Ex. 3 | $Li_{1.07}Ni_{0.38}Co_{0.32}Mn_{0.30}Mo_{0.003}O_2$ | 0.3 | 0.003 | 400 | 5.9 | 0.44 |
| Ex. 4 | $Li_{1.07}Ni_{0.38}Co_{0.32}Mn_{0.30}Mo_{0.003}O_2$ | 0.3 | 0.003 | 500 | 5.9 | 0.44 |
| Comp. Ex. 1 | $Li_{1.07}Ni_{0.38}Co_{0.32}Mn_{0.30}O_2$ | 0 | 0 | 500 | 6.2 | 0.46 |
| Comp. Ex. 2 | $Li_{1.07}Ni_{0.38}Co_{0.32}Mn_{0.30}Mo_{0.003}O_2$ | 0.3 | 0 | 500 | 5.7 | 0.45 |
| Comp. Ex. 3 | $Li_{1.07}Ni_{0.38}Co_{0.32}Mn_{0.30}O_2$ | 0 | 0.005 | 500 | 6.2 | 0.46 |
| Comp. Ex. 4 | $Li_{1.07}Ni_{0.38}Co_{0.32}Mn_{0.30}Mo_{0.003}O_2$ | 0.3 | 0.003 | 600 | 5.9 | 0.44 |

*1 Ratio to total number of Ni, Co, Mn, and Mo atoms in lithium composite oxide (100 atom %)

TABLE 2

| | Initial discharge capacity | Reaction resistance ($\Omega/cm^2$) | | |
|---|---|---|---|---|
| | (mAh/g) | −30° C. | 25° C. | 50° C. |
| Ex. 1 | 166.5 | 5.7 | 0.62 | 0.21 |
| Ex. 2 | 167.5 | 4.7 | 0.46 | 0.24 |
| Ex. 3 | 163.0 | 6.9 | 0.77 | 0.38 |
| Ex. 4 | 165.8 | 6.2 | 0.75 | 0.33 |
| Comp. Ex. 1 | 166.9 | 65.6 | 1.61 | 0.41 |
| Comp. Ex. 2 | 167.4 | 34.6 | 0.73 | 0.21 |
| Comp. Ex. 3 | 167.1 | 9.6 | 0.94 | 0.42 |
| Comp. Ex. 4 | 161.2 | 9.8 | 0.86 | 0.43 |

DESCRIPTION OF REFERENCE SIGNS

1 Positive electrode (electrode for evaluation)
2 Negative electrode (metal lithium)
3 Separator
4 Gasket
5 Wave washer
6 Positive electrode case
7 Negative electrode case

The invention claimed is:

1. A positive electrode active material for nonaqueous electrolyte secondary batteries, the positive electrode active material comprising:
a boron compound; and
lithium-nickel-cobalt-manganese composite oxide of general formula (1) having a layered hexagonal crystal structure,

$$Li_{1+s}Ni_xCo_yMn_zMo_tM_wO_2 \quad (1)$$

where −0.05≤s≤0.20, x+y+z+t+w=1, 0.1≤x≤0.7, 0.1≤y≤0.5, 0.1≤z≤0.5, 0.0003≤t≤0.05, 0≤w≤0.05, and M is one or more elements selected from Ca, Mg, Al, Ti, V, Cr, Zr, Nb, Hf, and Ta,
wherein the lithium-nickel-cobalt-manganese composite oxide including secondary particles, the secondary particles being composed of agglomerated primary particles, the boron compound being present on at least part of the surface of the primary particles, the boron compound containing lithium,
wherein the lithium-nickel-cobalt-manganese composite oxide has a ratio (B/Me) of the number of boron (B) atoms in the positive electrode active material to the total number of atoms of nickel, cobalt, manganese, molybdenum, and M (Me) from 0.001 to 0.05.

2. The positive electrode active material for nonaqueous electrolyte secondary batteries of claim 1, wherein the secondary particles have an average particle size from 3 μm to 20 μm.

3. The positive electrode active material for nonaqueous electrolyte secondary batteries of claim 1, wherein the primary particles have an average particle size from 0.2 μm to 0.5 μm.

4. The positive electrode active material for nonaqueous electrolyte secondary batteries of claim 1, wherein the secondary particles have an index [(d90−d10)/average particle size] of extent of particle size distribution of 0.60 or lower.

5. The positive electrode active material for nonaqueous electrolyte secondary batteries of claim 1, wherein the secondary particles further have a hollow structure in which an individual particle has a hollow section within the particle.

6. A method of producing a positive electrode active material for nonaqueous electrolyte secondary batteries as claimed in claim 1, the method comprising:
a crystallization step of obtaining particles of nickel-cobalt-manganese composite hydroxide of the general formula $Ni_xCo_yMn_zMo_tM_w(OH)_{2+\alpha}$, (where x+y+z+t+w=1, 0.1≤x≤0.7, 0.1≤y≤0.5, 0.1≤z≤0.5, 0.0003≤t≤0.05, 0≤w≤0.05, 0≤α≤0.5, and M is one or more elements selected from Ca, Mg, Al, Ti, V, Cr, Zr, Nb, Hf, and Ta);
a lithium-mixing step of mixing the nickel-cobalt-manganese composite hydroxide particles with a lithium compound so that the ratio of the number of lithium atoms to the total number of atoms of metallic elements except for lithium is from 0.95 to 1.20, to obtain a lithium mixture;
a firing step of firing the resulting lithium mixture by retaining the resulting lithium mixture in an oxidizing atmosphere at a firing temperature from 800° C. to 1000° C. for 5 to 20 hours to obtain lithium-nickel-cobalt-manganese composite oxide particles;
a boron-mixing step of mixing the lithium-nickel-cobalt-manganese composite oxide particles with a boron material to obtain a boron mixture; and
a heat-treatment step of subjecting the boron mixture to heat treatment in an oxidizing atmosphere at a temperature from 300° C. to 580° C.

7. The method of producing a positive electrode active material for nonaqueous electrolyte secondary batteries of claim 6, wherein the boron material is boron oxide and/or boron oxoacid.

8. The method of producing a positive electrode active material for nonaqueous electrolyte secondary batteries of claim 7, wherein the boron material is o-boric acid.

9. The method of producing a positive electrode active material for nonaqueous electrolyte secondary batteries of claim 6, further comprising a pulverization step of pulverizing the lithium-nickel-cobalt-manganese composite oxide particles obtained in the firing step.

10. A nonaqueous electrolyte secondary battery comprising:
   a positive electrode;
   a negative electrode;
   a separator; and
   a nonaqueous electrolyte,
   the positive electrode including, as positive electrode material thereof, the positive electrode active material for nonaqueous electrolyte secondary batteries as claimed in claim 1.

* * * * *